United States Patent
Hong et al.

(10) Patent No.: US 12,525,831 B2
(45) Date of Patent: Jan. 13, 2026

(54) FERRITE SPOKE-TYPE PERMANENT MAGNET SYNCHRONOUS MOTOR FOR ELECTRIC TRUCKS

(71) Applicant: The Board of Trustees of The University of Alabama, Tuscaloosa, AL (US)

(72) Inventors: Yang-Ki Hong, Tuscaloosa, AL (US); Hoyun Won, Tuscaloosa, AL (US); Jonathan Platt, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 143 days.

(21) Appl. No.: 17/747,509

(22) Filed: May 18, 2022

(65) Prior Publication Data
US 2022/0393529 A1    Dec. 8, 2022

Related U.S. Application Data

(60) Provisional application No. 63/189,910, filed on May 18, 2021.

(51) Int. Cl.
*H02K 1/2706* (2022.01)
*H02K 1/02* (2006.01)
(Continued)

(52) U.S. Cl.
CPC ............. *H02K 1/2706* (2013.01); *H02K 1/02* (2013.01); *H02K 1/16* (2013.01); *H02K 7/003* (2013.01); *H02K 11/30* (2016.01)

(58) Field of Classification Search
CPC ........ H02K 1/27; H02K 1/2706; H02K 1/272; H02K 1/2726; H02K 1/2753;
(Continued)

(56) References Cited

U.S. PATENT DOCUMENTS

| | | | |
|---|---|---|---|
| 9,461,510 B2* | 10/2016 | Lillington | H02K 1/27 |
| 9,496,770 B2* | 11/2016 | Grillenberger | H02K 5/04 |
| | | | 310/54 |

(Continued)

FOREIGN PATENT DOCUMENTS

| | | | | |
|---|---|---|---|---|
| DE | 102008026648 A1 * | 12/2009 | | H02K 1/2773 |
| EP | 2169821 B1 * | 9/2011 | | H02P 21/22 |

OTHER PUBLICATIONS

EP2169821B1_Translation (Year: 2023).*
(Continued)

*Primary Examiner* — Christopher M Koehler
*Assistant Examiner* — Ahmed F Seck
(74) *Attorney, Agent, or Firm* — Meunier Carlin & Curfman LLC (57) ABSTRACT

Various implementations include a six-phase electric motor including an annular stator and a rotor. The stator defines an opening having an inner surface. First and second three-phase sets of concentrated windings are circumferentially spaced along the inner surface of the opening. The first and second sets of concentrated windings are circumferentially offset from each other. The stator defines voids located radially outwardly from, and circumferentially between, each of the windings. The rotor includes permanent magnets circumferentially spaced around the rotor axis. The outer circumferential surface of the rotor defines grooves located circumferentially between each of the permanent magnets. The rotor is disposed within the stator opening such that the stator and rotor are coincident with each other. Flux from the permanent magnets interacts with a stator magnetic field created by a current flowing through the first and second sets of concentrated windings to cause the rotor to rotate.

20 Claims, 5 Drawing Sheets

(51) Int. Cl.
*H02K 1/16* (2006.01)
*H02K 7/00* (2006.01)
*H02K 11/30* (2016.01)

(58) Field of Classification Search
CPC ............... H02K 1/2773; H02K 1/2788; H02K 1/2789; H02K 1/2795; H02K 2201/03; H02K 2201/15; H02K 1/14; H02K 1/145; H02K 1/146; H02K 1/16; H02K 1/185; H02K 21/10; H02K 21/125; H02K 21/145; H02K 21/16
See application file for complete search history.

(56) References Cited

U.S. PATENT DOCUMENTS

| | | | | |
|---|---|---|---|---|
| 9,837,881 | B2* | 12/2017 | Schneider | H02K 1/2773 |
| | | | | 310/156.61 |
| 2003/0085627 | A1* | 5/2003 | Lipo | H02K 3/28 |
| | | | | 310/12 |
| 2014/0084741 | A1* | 3/2014 | Iwasaki | H02K 29/03 |
| | | | | 310/216.091 |
| 2015/0028707 | A1* | 1/2015 | Kim | H02K 1/02 |
| 2015/0035402 | A1* | 2/2015 | Reddy | H02K 1/272 |
| | | | | 310/156.61 |
| 2019/0103791 | A1* | 4/2019 | Goel | H02K 1/2713 |
| 2021/0091618 | A1* | 3/2021 | Cummings | H02K 1/16 |

OTHER PUBLICATIONS

17747509_2024_09_18_DE_102008026648_A1_H.pdf(Year: 2024).*
MarketsAndMarkets, Electric Vehicle Market by Vehicle (Passenger Cars & Commercial Vehicles), Vehicle Class (Mid-priced & Luxury) . . . . Online: https://www.marketsandmarkets.com/Market-Reports/electric-vehicle-market-209371461.html.
Environmental leaders, "Electric Drive Truck Sales by Powertrain Type, World Markets: 2016-2026," Navigant Research. Online: https://www.environmentalleader.com/wp-content/uploads/2017/01/Navigant-Research-electric-truck-forecast.jpg.
Smith, et al., "Medium- and Heavy-duty Vehicle Electrification An Assessment of Technology and Knowledge Gap," ORNL/SPR-2020/7, Dec. 2019.
Hernandez, "Nissan LEAF electric motor and transmission," Living LEAF, Nov. 2010, [URL: http://livingleaf.info/2010/11/nissan-leaf-electric-motor-and-transmission/.
Cheng, Y. Sui, P. Zheng, Z. Yin and C. Wang, "Influence of Stator MMF Harmonics on the Utilization of Reluctance Torque in Six-phase PMASynRM with FSCW," Energies 11, 108, pp. 1-17, Oct. 2017.
El-Refaie, J. P. Alexander, S. Galioto, P. B. Reddy, K. Huh, P. Bock, and X. Shen, "Advanced High-Power-Density Interior Permanent Magnet Motor for Traction Applications," IEEE Transactions on Industry Application 50, 1, pp. 3235-3248, Sep./Oct. 2014.
Olszewski, "Evaluation of the 2010 Toyota Prius Hybrid Synergy Drive System," FY2011 Oak Ride National Laboratory Report, Mar. 2011.
Ma, "Low-cost Interior Permanent Magnet Machine with Multiple Magnet Types," IEEE Trans. Ind. Appl., 56 (2), pp. 1452, Mar. 2020.

* cited by examiner

FERRITE SPOKE-TYPE PERMANENT MAGNET SYNCHRONOUS MOTOR FOR ELECTRIC TRUCKS

CROSS-REFERENCE TO RELATED APPLICATIONS

This application claims the benefit of U.S. Provisional Patent Application No. 63/189,910, filed May 18, 2021, the content of which is incorporated herein by reference in its entirety.

BACKGROUND

Due to the high amounts of greenhouse gases, both federal and state governments in the U.S. have set strict emission reduction targets, and social infrastructure has already dramatically changed. Accordingly, the U.S. electric truck's revenue is projected to increase to $30 billion in 2030, at a CAGR of 58.2% between 2020 and 2030. Electric truck's revenue was $211.5 million in 2019. However, current medium-duty electric truck motors are too heavy, too expensive, and too inefficient to be effective.

Thus, a need exists for lighter, more cost-effective, and more energy-efficient motors for medium duty trucks.

SUMMARY

Various implementations include a six-phase electric motor. The motor includes an annular stator and a rotor.

The annular stator has a stator axis, a first stator side, and a second stator side opposite and spaced apart from the first stator side along the stator axis. The first stator side defines an opening extending to the second stator side. The opening has an inner surface. A first three-phase set of six or more concentrated windings and a second three-phase set of six or more concentrated windings are circumferentially spaced along at least the inner surface of the opening of the stator. The first three-phase set of concentrated windings is circumferentially offset from the second three-phase set of concentrated windings. The first stator side defines twelve or more voids extending to the second stator side and located radially outwardly from, and circumferentially between, each of the windings of the first and second three-phase set of concentrated windings.

The rotor has a rotor axis, a first rotor side, a second rotor side opposite and spaced apart from the first rotor side along the rotor axis, and an outer circumferential surface extending from the first rotor side to the second rotor side. The rotor includes four or more permanent magnets circumferentially spaced around the rotor axis. The outer circumferential surface defines four or more grooves extending axially from the first rotor side to the second rotor side and located circumferentially between each of the four or more permanent magnets. The rotor is disposed within the stator opening such that the stator axis and rotor axis are coincident with each other. Flux from the four or more permanent magnets interacts with a stator magnetic field created by a current flowing through the first and second three-phase set of concentrated windings to cause the rotor to turn about the rotor axis.

In some implementations, the first three-phase set of six or more concentrated windings includes twelve or more concentrated windings, the second three-phase set of six or more concentrated windings includes twelve or more concentrated windings, and the four or more permanent magnets includes ten or more permanent magnets. In some implementations, the first three-phase set of concentrated windings is circumferentially offset from the second three-phase set of concentrated windings by an offset angle of 75 degrees.

In some implementations, the permanent magnets comprise rare earth-free permanent magnets. In some implementations, the rare earth-free permanent magnets comprise ferrite permanent magnets. In some implementations, the ferrite permanent magnets comprise strontium ferrite. In some implementations, the ferrite permanent magnets comprise barium ferrite. In some implementations, the permanent magnets comprise Nd-based rare-earth magnets.

In some implementations, the twelve or more voids have a circular cross-section as viewed in a plane parallel to the first stator side and the four or more grooves have a semicircular cross-section as viewed in a plane parallel to the first rotor side.

In some implementations, a total number of concentrated windings is greater than a total number of permanent magnets.

In some implementations, the motor further includes a nonmagnetic shaft, and the rotor includes a soft magnetic rotor core. The first rotor side of the soft magnetic rotor core defines rectangular openings extending to the second rotor side of the soft magnetic rotor core, and the nonmagnetic shaft includes rectangular protrusions each extending outwardly in a radial direction. Each of the rectangular protrusions are disposed within one of the rectangular openings. In some implementations, each of the rectangular protrusions includes one or more cross members extending perpendicular to the radial direction and the soft magnetic rotor core defines corresponding openings for receiving the cross members.

In some implementations, each of the four or more permanent magnets have a magnetic flux. The magnetic flux of each of the four or more permanent magnets is oriented in a radial direction.

In some implementations, the four or more permanent magnets are oriented in a spoke-type configuration.

In some implementations, the four or more permanent magnets have a rectangular cross-section as viewed in a plane parallel to the first rotor side.

In some implementations, the four or more permanent magnets have a trapezoidal cross-section as viewed in a plane parallel to the first rotor side.

Various other implementations include an electric motor system. The system includes a six-phase electric motor as described above, a power system including a direct current battery and an inverter for changing the direct current from the battery into alternating current, and a computer system for controlling the inverter.

In some implementations, the inverter is a first inverter, and the system further includes a second inverter. The first three-phase set of six or more concentrated windings is in electrical communication with the first inverter and the second three-phase set of six or more concentrated windings is in electrical communication with the second inverter.

In some implementations, the inverter is a six-phase inverter, and the first and second three-phase sets of six or more concentrated windings is in electrical communication with the six-phase inverter.

In some implementations, the first three-phase set of six or more concentrated windings includes twelve or more concentrated windings, the second three-phase set of six or more concentrated windings includes twelve or more concentrated windings, and the four or more permanent magnets includes ten or more permanent magnets. In some implementations, the first three-phase set of concentrated windings is circumferentially offset from the second three-phase set of concentrated windings by an offset angle of 75 degrees.

In some implementations, the permanent magnets comprise rare earth-free permanent magnets. In some implementations, the rare earth-free permanent magnets comprise ferrite permanent magnets. In some implementations, the ferrite permanent magnets comprise strontium ferrite. In some implementations, the ferrite permanent magnets comprise barium ferrite. In some implementations, the permanent magnets comprise Nd-based rare-earth magnets.

In some implementations, the twelve or more voids have a circular cross-section as viewed in a plane parallel to the first stator side and the four or more grooves have a semicircular cross-section as viewed in a plane parallel to the first rotor side.

In some implementations, a total number of concentrated windings is greater than a total number of permanent magnets.

In some implementations, the motor further includes a nonmagnetic shaft, and the rotor includes a soft magnetic rotor core. The first rotor side of the soft magnetic rotor core defines rectangular openings extending to the second rotor side of the soft magnetic rotor core, and the nonmagnetic shaft includes rectangular protrusions each extending outwardly in a radial direction. Each of the rectangular protrusions are disposed within one of the rectangular openings. In some implementations, each of the rectangular protrusions includes one or more cross members extending perpendicular to the radial direction and the soft magnetic rotor core defines corresponding openings for receiving the cross members.

In some implementations, each of the four or more permanent magnets have a magnetic flux. The magnetic flux of each of the four or more permanent magnets is oriented in a radial direction.

In some implementations, the four or more permanent magnets are oriented in a spoke-type configuration.

In some implementations, the four or more permanent magnets have a rectangular cross-section as viewed in a plane parallel to the first rotor side.

In some implementations, the four or more permanent magnets have a trapezoidal cross-section as viewed in a plane parallel to the first rotor side.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

The devices, systems, and methods described herein include a novel six-phase stator-shifted fractional slot concentrated winding ferrite spoke-type PMSM (6Φ-S-FSCW-FSPMSM). Various example implementations of the novel 6Φ-S-FSCW-FSPMSM include 1) a stator with dual three-phase windings that have a phase shift of 75 degrees between two three-phase windings, 2) a rotor in a spoke configuration, 3) ferrite permanent magnets having a remanent flux density of 0.45 T and coercivity of 329 kA/m, 4) circular voids on the stator and grooves on the rotor, and 5) rectangular protrusions on the nonmagnetic shaft that engage complimentary openings in the rotor. Various implementations of this novel motor do not use rare-earth permanent magnets and show high torque, low torque ripple, and low induced voltage when used in electric vehicle and truck applications.

Figure 1A:
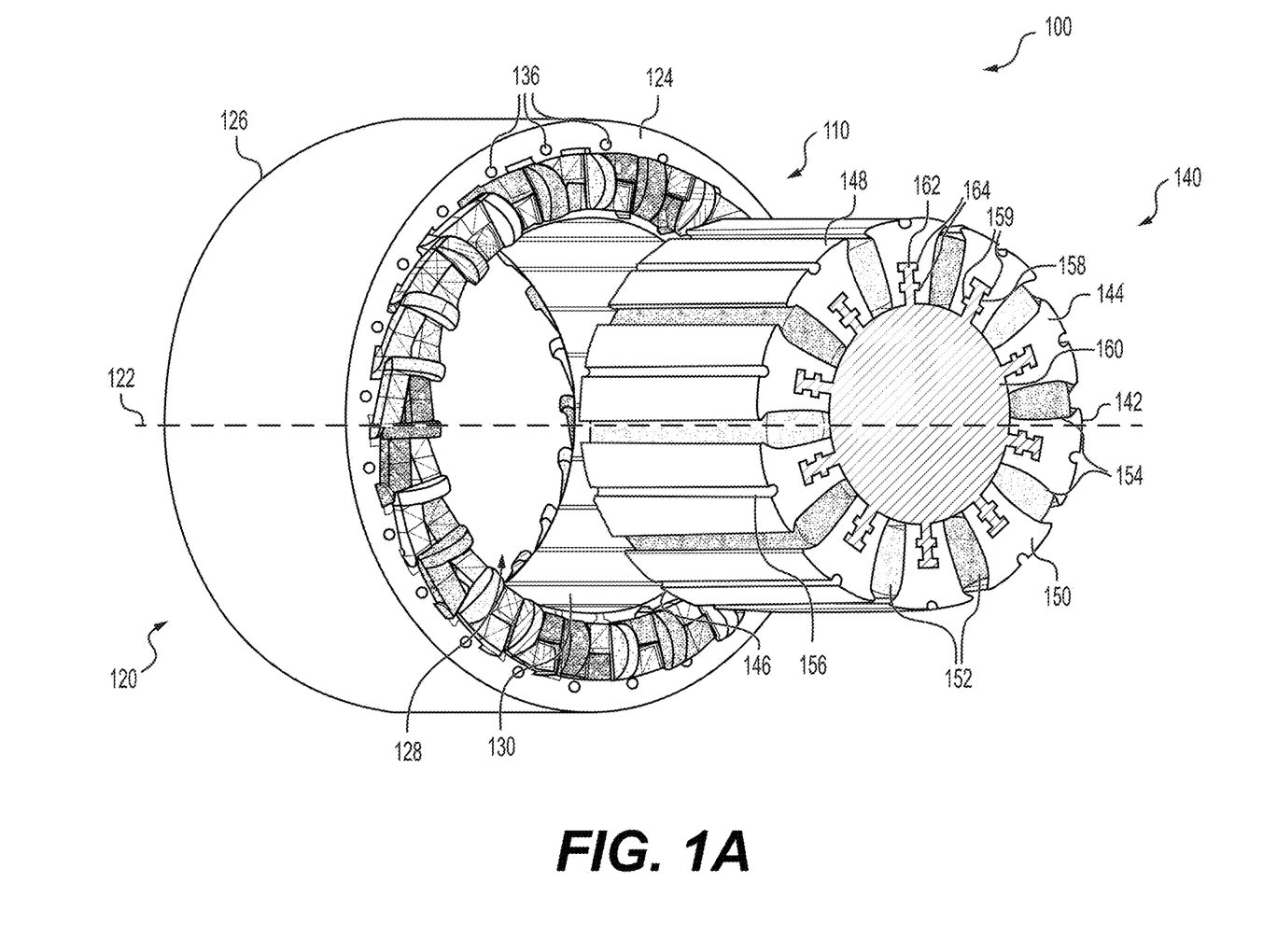
FIG. 1A is a perspective view of an electric motor system including a six-phase stator-shifted fractional slot concentrated winding ferrite spoke-type permanent magnet synchronous motor (6Φ-S-FSCW-FSPMSM), according to one implementation.
Figure 1B:
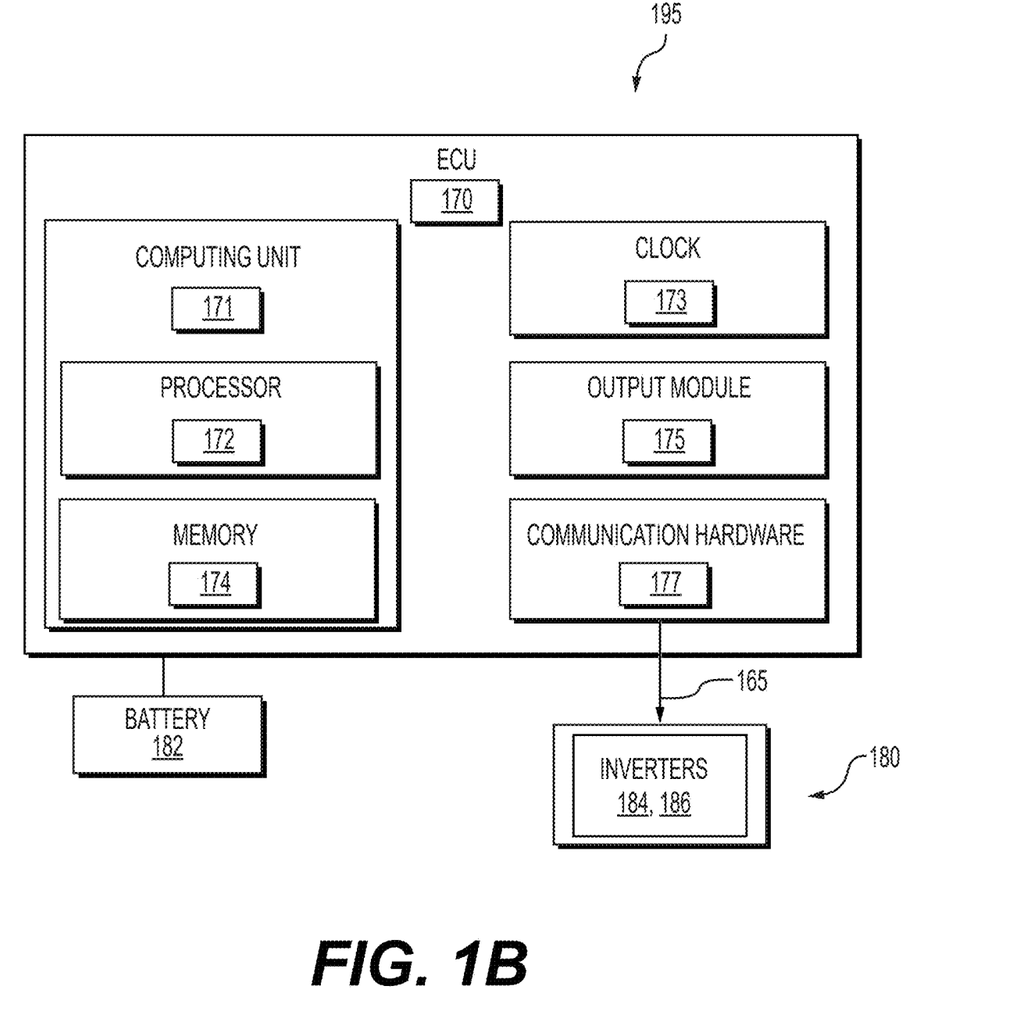
FIG. 1B is a schematic illustration of an example electronic control unit and associated computer hardware used in conjunction with the systems and methods of this disclosure.

FIGS. 1A and 1B show an implementation of an electric motor system. The system 100 includes a six-phase electric motor 110, a power system 180, and a computer system 195.

The motor 110 shown in FIG. 1A includes an annular stator 120, a rotor 140, and a nonmagnetic shaft 160.

The annular stator 120 has a stator axis 122, a first stator side 124, and a second stator side 126 opposite and spaced apart from the first stator side 124 along the stator axis 122. The first stator side 124 defines a stator opening 128 extending to the second stator side 126, and the stator opening 128 has an inner surface 130.

Figure 4A:
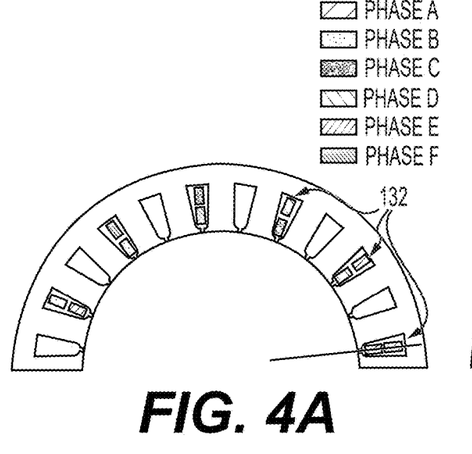
FIGS. 4A-4C are end views of designs of A) first- and B) second-set of the 12-slot/10-pole winding layout and C) resultant 24-slot/10-pole winding layout.
Figure 4B:
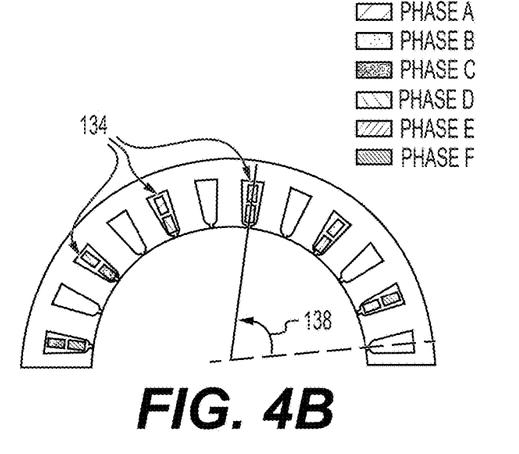
Figure 4C:
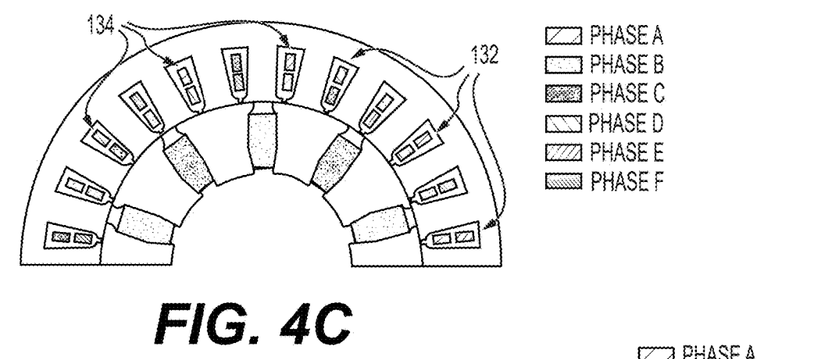

As shown in FIGS. 4A-4C, a first three-phase set of twelve concentrated windings 132 and a second three-phase set of twelve concentrated windings 134 are circumferentially spaced along at least the inner surface 130 of the stator opening 128 of the stator 120. The first three-phase set of concentrated windings 132 is circumferentially offset from the second three-phase set of concentrated windings 134 by an offset angle 138 of 75 degrees to create a stator shifting configuration. However, in other implementations, the first three-phase set of concentrated windings is circumferentially offset from the second three-phase set of concentrated windings by any suitable offset angle.

In some implementations, the first three-phase set of concentrated windings includes any number of six or more concentrated windings, and the second three-phase set of concentrated windings includes any number of six or more concentrated windings.

The first stator side 124 defines twenty-four voids 136 extending to the second stator side 126. Each void 136 is located radially outwardly from, and circumferentially between, each of the twenty-four concentrated windings of the first and second three-phase set of concentrated windings 132, 134. Each of the voids 136 shown in FIG. 1A has a circular cross-section as viewed in a plane parallel to the first stator side 124. However, in other implementations, the voids have any other suitable cross-sectional shape as viewed in a plane parallel to the first stator side. In implementations in which the stator includes any other number of total concentrated windings, the stator defines an equal number of voids.

The rotor 140 shown in FIG. 1A has a rotor axis 142, a first rotor side 144, a second rotor side 146 opposite and spaced apart from the first rotor side 144 along the rotor axis 142, and an outer circumferential surface 148 extending from the first rotor side 144 to the second rotor side 146. The rotor 140 includes a soft magnetic rotor core 150 and ten permanent magnets 152 disposed within magnet openings 154 in the soft magnetic core 150. The ten permanent magnets 152 are circumferentially spaced around the rotor axis 142. The permanent magnets 152 each have a rectangular cross-section as viewed in a plane parallel to the first rotor side. Each of the ten permanent magnets 152 has a magnetic flux, and the magnetic flux of each of the ten permanent magnets is oriented in a radial direction such that the ten permanent magnets 152 are oriented in a spoke-type configuration.

Although the rotor 140 shown in FIG. 1A includes ten permanent magnets 152, in some implementations, the rotor includes any number of four or more permanent magnets. In some implementations, the four or more permanent magnets each have a trapezoidal cross-section as viewed in a plane parallel to the first rotor side, or any other cross-sectional shape.

The permanent magnets 152 shown in FIG. 1A include strontium ferrite permanent magnets, but in other implementations, the permanent magnets include barium ferrite or any other ferrite permanent magnet, any rare earth-free permanent magnets, or any Nd-based rare-earth magnets.

The outer circumferential surface 148 of the rotor 140 shown in FIG. 1A defines ten grooves 156 extending axially from the first rotor side 144 to the second rotor side 146 and located circumferentially between each of the ten permanent magnets 152. Each of the ten grooves 156 has a semicircular cross-section as viewed in a plane parallel to the first rotor side 144. However, in other implementations, the grooves have any other suitable cross-sectional shape as viewed in a plane parallel to the first rotor side. In implementations in which the rotor includes any other number of permanent magnets, the rotor defines an equal number of grooves.

Although FIG. 1A shows an exploded view of an electric motor 110, in use, the rotor 140 is disposed within the stator opening 128 such that the stator axis 122 and rotor axis 142 are coincident with each other. Flux from the ten permanent magnets 152 interact with a stator magnetic field created by a current flowing through the first and second three-phase set of concentrated windings 132, 134 to cause the rotor 140 to turn about the rotor axis 142.

It should be noted that the total number of concentrated windings 132, 134 of the motor 110 shown in FIG. 1A is greater than a total number of permanent magnets 152 such that the motor 110 has a fractional slot configuration.

The nonmagnetic shaft 160 shown in FIG. 1A includes rectangular protrusions 162 each extending outwardly in a radial direction. Each of the rectangular protrusions 162 includes two cross members 164 extending perpendicular to the radial direction. However, in other implementations, each of the rectangular protrusions includes no cross members, one cross member, or three or more cross members extending perpendicular to the radial direction.

The first rotor side 144 of the soft magnetic rotor core 150 shown in FIG. 1A defines rectangular openings 158 extending to the second rotor side 146 of the soft magnetic rotor core 150 that correspond to the shape and location of the rectangular protrusions 162 extending from the nonmagnetic shaft 160. Each of the rectangular protrusions 162 are disposed within one of the rectangular openings 158 to couple the rotor 140 to the nonmagnetic shaft 160. Each of the rectangular openings 158 of the soft magnetic rotor core 150 include two cross member openings 159 that have a complimentary shape to the cross members 164 of the rectangular protrusions 162. However, in implementations in which the rectangular protrusions include any other number or shape cross members, the soft magnetic rotor core defines a corresponding number of cross member openings for receiving the cross members of the rectangular protrusions of the nonmagnetic shaft.

The power system 180 shown in FIG. 1B includes a direct current battery 182 and two inverters 184, 186 for changing the direct current from the battery 182 into alternating current. The first three-phase set of twelve concentrated windings 132 is in electrical communication with the first inverter 184 and the second three-phase set of twelve concentrated windings 134 is in electrical communication with the second inverter 186.

In some implementations, the power system only includes one six-phase inverter, and the first and second three-phase sets of twelve concentrated windings is in electrical communication with the six-phase inverter.

The computer system 195 shown in FIG. 1B is configured to control the inverter. A computer system 195 such as that of FIG. 1B and described below, utilizes a controller, such as an electronic control unit ("ECU") 170 to implement software stored in computer memory 174, and the software is programmed to implement the methods of this disclosure using the above-described sensors. In some implementations, the software implements computer commands via the processor 172, which provides control signals across the network 165 in bi-directional communications to two inverters and associated components of the systems (e.g., system 100) described herein.

Implementations described above and in relation to FIG. 1A may be used with equipment that implements computerized methods that are activated with the ECU 170. In particular, the inverters communicate with a computer processor 172 configured to process one or more characteristics and/or profiles of the electrical signals received. By way of example and without limiting this disclosure to any particular hardware or software, FIG. 1B illustrates a block diagram of a system herein according to one implementation. The computer processor 172 shown in FIG. 1B may comprise one or more processors, and the same or different processors may execute computer-readable instructions related to the activation of the inverters.

The ECU, also referred to as a controller 170, may include a computing unit 171, a system clock 173, an output module 175 and communication hardware 177. In its most basic form, the computing unit or controller 171 may include a processor 172 and a system memory 174. The processor 172 may be a standard programmable processor that performs arithmetic and logic operations necessary for operation of the controller 170. The processor 172 may be configured to execute program code encoded in tangible, computer-readable media. For example, the processor 172 may execute program code stored in the system memory 174, which may be volatile or non-volatile memory. The system memory 174 is only one example of tangible, computer-readable media. In one aspect, the computing unit 171 can be considered an integrated device such as firmware. Other examples of tangible, computer-readable media include hard drives, flash memory, or any other machine-readable storage media, wherein when the program code is loaded into and executed by a machine, such as the processor 172, the machine becomes an apparatus for practicing the disclosed subject matter.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the vehicle computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Table I below summarizes the motor specifications of the electric motor shown in FIG. 1A.

TABLE I

Specifications of invented 6Φ-S-FSCW-FSPMSM.

| Parameter | Value |
| --- | --- |
| Stator Outer/inner diameter [mm] | 525/351 |
| Rotor Outer/inner diameter [mm] | 348/196 |
| Stack Length [mm] | 270 |
| Number of slot/pole | 24/10 |
| Number of turns | 32 |
| Number of parallel paths | 8 |
| Maximum current [$A_{rms}$] | 500 |
| Peak power density [Nm/L] | 37.0 |
| Soft Iron Core Material | M19-29G |
| Base/Maximum speed [rpm] | 2400/4950 |

Examples

Figure 2A:
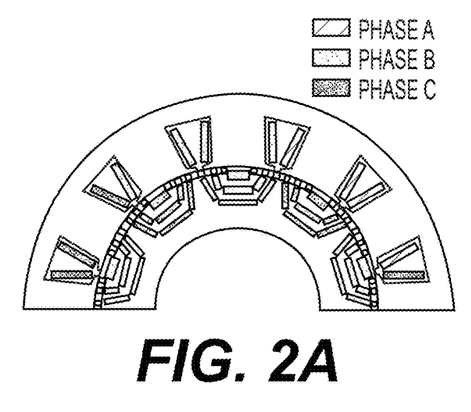
FIGS. 2A-2D are end views of designs of three-phase FSCWs A) PMASynRM, B) V-type, C) SPM, and D) spoke-type PMSM.
Figure 2B:
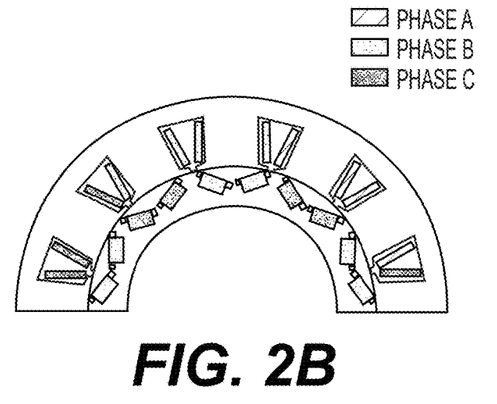
Figure 2C:
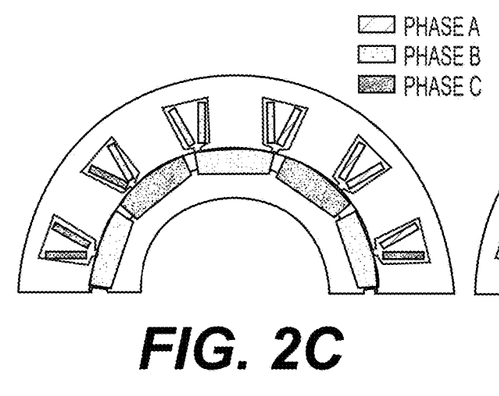
Figure 2D:
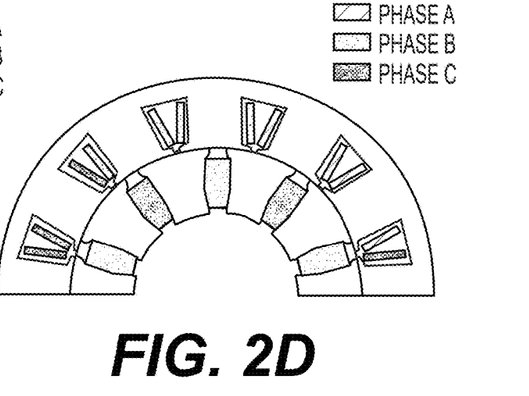

First, the motor having twelve slots with conventional three-phase windings and ten ferrite permanent magnets with four different rotor topologies is simulated to determine the topology exhibiting the best motor performance. The four simulated rotor topologies are permanent magnet-assisted synchronous reluctance machine (PMASynRM) (shown in FIG. 2A), V-type PMSM (shown in FIG. 2B), surface-mounted PMSM (SPM) (shown in FIG. 2C), and spoke-type PMSM (shown in FIG. 2D).

ANSYS Maxwell 2D-finite element analysis (FEA) v.18.1 is used to simulate the motor performance. Table II summarizes the performance of four different rotor topologies. Among four topologies, the spoke-type topology shows the highest torque and good torque ripple and back EMF at 3000 rpm. Because of its good performance, the spoke-type topology is selected for further investigation.

TABLE II

Performance Comparison Between Four Topologies.

| Parameter | SPM | PMASynRM | V-type | Spoke-type |
| --- | --- | --- | --- | --- |
| Torque [Nm] | 1670 | 1710 | 1250 | 1880 |
| Torque Ripple [%] | 3.6 | 10.4 | 14.5 | 12.2 |
| Peak Back EMF at 3000 rpm [V] | 1200 | 2888 | 3023 | 2428 |

Figures 3A, 3B:
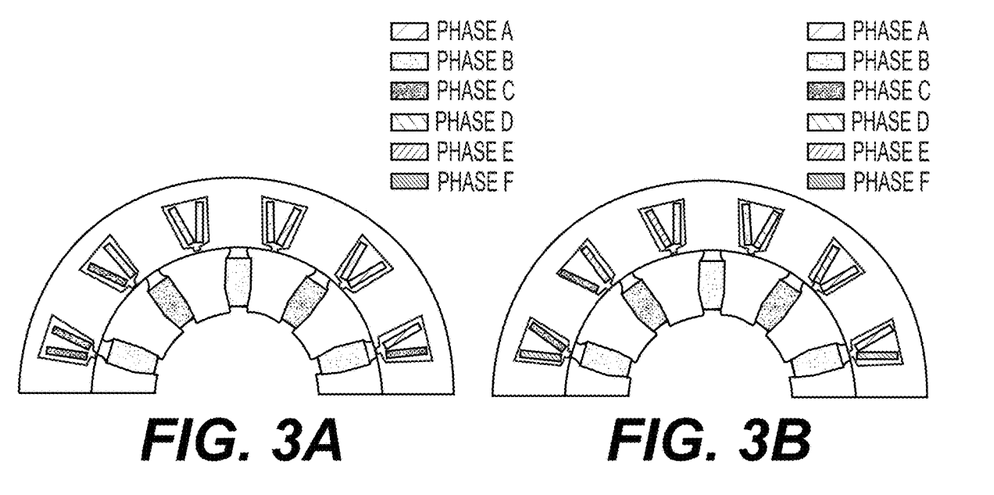
FIGS. 3A and 3B are end views of designs of A) three-phase and B) six-phase FSCW ferrite spoke-type motors.

Recently, multiphase machines received much attention due to their fault-tolerance capabilities and low induced voltage compared with a conventional three-phase machine [5]. Six-phase machines show the most promising performance among multiphase machines because they can utilize two common conventional three-phase inverters. Accordingly, a six-phase ferrite spoke-type PMSM (FSPMSM) is investigated and compared with a three-phase FSPMSM. FIGS. 3A and 3B illustrate the three- and six-phase FSPMSM, respectively, while Table III shows their relative performance. As Table III shows, the six-phase FSPMSM exhibits slightly higher torque and 22.1% lower torque ripple, and 45.1% lower peak back-EMF at 3000 rpm. However, the torque ripple and peak back-EMF are too high for use in electric vehicles.

TABLE III

Performance comparison between three- and six-phase FSCW ferrite spoke-type motor.

| Parameter | Three-phase | Six-phase |
|---|---|---|
| Torque [Nm] | 1880 | 1920 |
| Torque Ripple [%] | 12.2 | 9.5 |
| Peak Back EMF at 3000 rpm [V] | 2428 | 1320 |

Thus, to further reduce the torque ripple and peak back-EMF, a new stator-shifted 24-slot 10-pole machine having an asymmetrical six-phase winding with a of 75 degrees shifted between the two three-phase windings is employed. FIG. 4 shows the design of conventional 12-slot and 10-pole and stator shifted 24-slot and 10-pole six-phase FSCW FSPMSM, whereas Table IV summarizes the corresponding performance. FIG. 4A shows the first set of the 12-slot/10-pole winding layout, FIG. 4B shows the second set of the 12-slot/10-pole winding layout, and FIG. 4C shows the resultant 24-slot/10-pole winding layout. Note that the number of turns is halved from 64 to 32 due to decreased slot size as the number of slots increased from 12 to 24. The result shows that the torque is increased by 11.5%, while the torque ripple and induced voltage are decreased by 34.7 and 43.8%, respectively.

TABLE IV

Performance comparison between unconventional and stator-shifted 6-S-FSCW-FPMSM.

| Parameter | Conventional 12-slot | Stator-shifted 24-slot |
|---|---|---|
| Number of turns | 64 | 32 |
| Torque [Nm] | 1920 | 2142 |
| Torque Ripple [%] | 9.5 | 6.2 |
| Peak Back EMF at 3000 rpm [V] | 1320 | 742 |

Figures 5A, 5B:
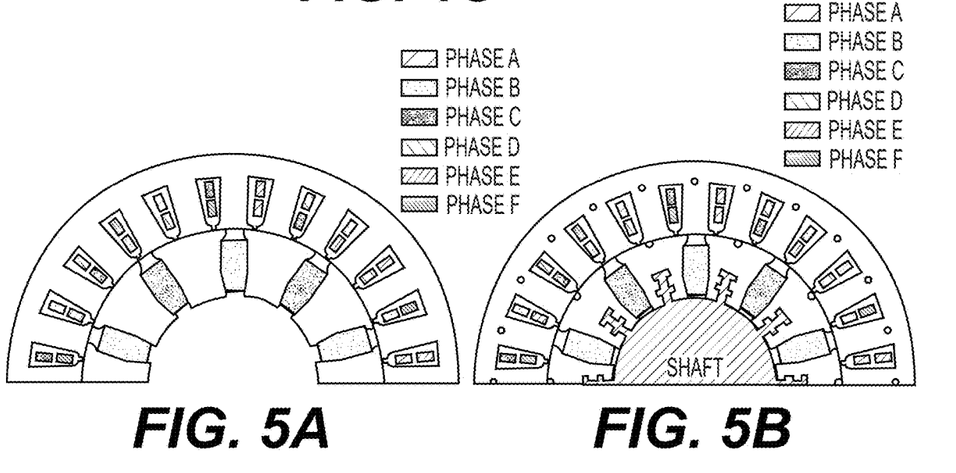
FIGS. 5A and 5B are end views of designs of 6Φ-S-FSCW-FSPMSM with A) no void and B) 2 circular voids and rectangular nonmagnetic shaft fixture.
Figure 6:
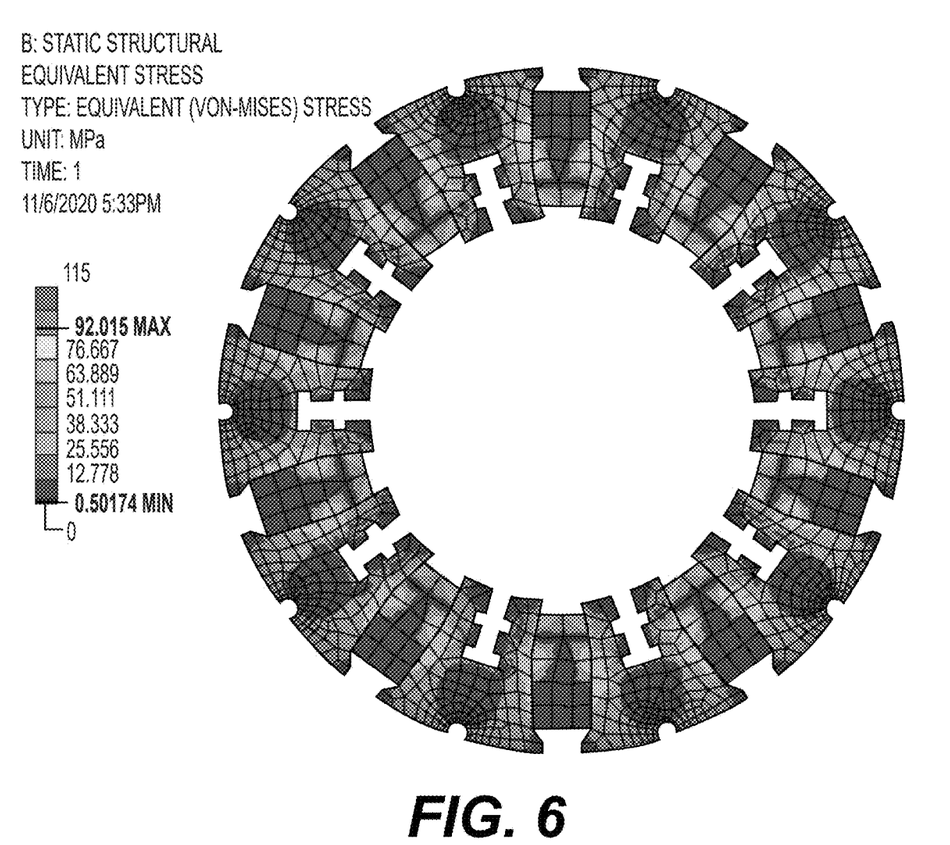
FIG. 6 is a stress distribution in the rotor of the 6Φ-S-FSCW-FSPMSM of FIG. 1A at 4500 rpm.

In 2011, the US Department of Energy (DOE) announced the target torque ripple of electrical traction motor to be less than 5%. To further reduce the torque ripple of 6.2% to below 5%, two circular voids Table V shows the performance of 6Φ-S-FSCW-FSPMSM with and without circular voids and a rectangular cavity-based nonmagnetic shaft. FIG. 5A shows the 6Φ-S-FSCW-FSPMSM without circular voids or the rectangular cavity-based nonmagnetic shaft, and FIG. 5B shows the 6Φ-S-FSCW-FSPMSM with circular voids or the rectangular cavity-based nonmagnetic shaft. It is noted that the void and nonmagnetic shaft inclusion did not alter the peak induced voltage. For 6Φ-S-FSCW-FSPMSM with a circular void only on the stator, the torque and torque ripple are reduced slightly compared to the design without voids. When the circular void is on the rotor, the torque is increased from 2142 to 2155 Nm, while the torque ripple is decreased by 22.6%. With 2 circular voids, the torque ripple is further reduced to 4.1%. To hold and rotate the rotor using the nonmagnetic shaft, the rectangular cavity is included. None of the motor performances are affected by rectangular cavity inclusion. A mechanical FEA analysis was conducted to validate the mechanical stability of the motor. FIG. 6 shows the stress distribution in the rotor of the invented 6Φ-S-FSCW-FSPMSM at 4500 rpm. The result shows that the stress is well below the rotor's stress limit, which is 345 MPa.

TABLE V

Performance comparison of 6Φ-S-FSCW-FSPMSM without and with void and shaft.

| Parameter | No void | 1 void on stator | 1 void on rotor | 2 voids | 2 voids with shaft |
|---|---|---|---|---|---|
| Torque [Nm] | 2142 | 2140 | 2155 | 2150 | 2150 |
| Torque ripple [%] | 6.2 | 5.5 | 4.8 | 4.1 | 4.1 |
| Torque ripple difference from no circular void [%] | — | 11.3 | 22.6 | 33.9 | 33.9 |

Figure 7A:
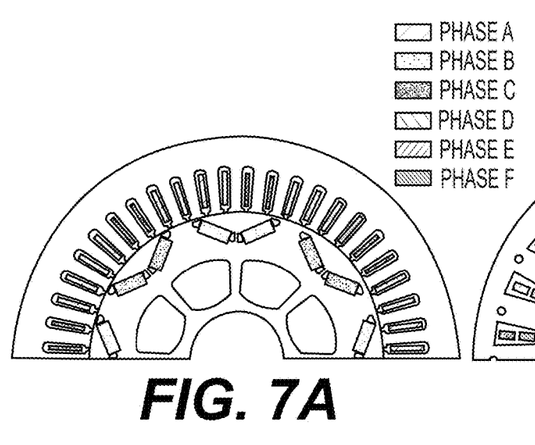
FIGS. 7A and 7B are end views of designs of A) three-phase ISDW Prius PMSM and B) proposed 6Φ-S-FSCW-FSPMSM.
Figure 7B:
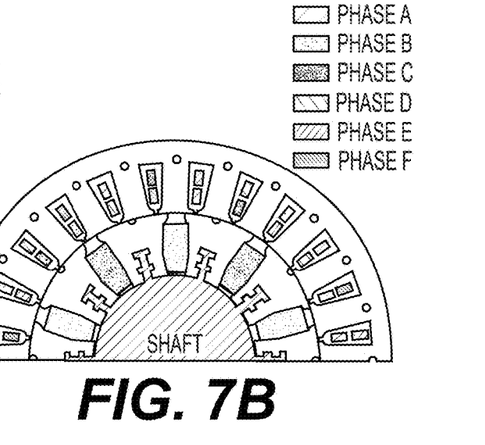

Lastly, the invented motor was compared with conventional three-phase ISDW V-type PMSM used in Toyota Prius with NdFeB and ferrite, as illustrated in FIG. 7, to assess the effectiveness of the invented 6Φ-S-FSCW-FSPMSM [7]. Table VI shows the performance comparison between the Prius motor with NdFeB and ferrite and the invented motor. The invented 6Φ-S-FSCW-FSPMSM exhibits comparable peak torque, 79.3-81% lower torque ripple, 70.4-80.5% lower induced voltage at 3000 rpm, −3-28.5% lower peak torque density, no demagnetization, and 180-433.3% higher base and maximum speed compared to the Prius motor with NdFeB and ferrite.

TABLE VI

Performance comparison between Prius motor with NdFeB and ferrite and invented motor.

| Parameter | Prius (NdFeB) | Prius (Ferrite) | Invented motor (Ferrite) |
|---|---|---|---|
| Peak torque [Nm] | 2133.4 | 2180 | 2150 |
| Torque ripple [%] | 22.6 | 19.8 | 4.1 |
| Back EMF at 3000 rpm [V] | 2500 | 3790 | 740 |
| Volume [L] | 43.3 | 60.6 | 58.4 |
| Peak torque density [Nm/L] | 49.3 | 35.9 | 37.0 |
| Demagnetization [%] | 0 | 10 | 0 |
| Battery Voltage [V] | | 700 | |
| Base speed [rpm] | 750 | 450 | 2400 |
| Maximum speed [rpm] | 1750 | 950 | 4950 |

The invented 6Φ-S-FSCW-FSPMSM employs stator-shifted dual three-phase fractional slot concentrated windings that are 75 degrees apart between two three-phase windings and a spoke-type rotor topology using cheap and highly resistant ferrite. The invented 6Φ-S-FSCW-FSPMSM can drive electric trucks with good peak torque, low peak torque ripple, and high maximum speed based on the simulation results.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A six-phase electric motor, the motor comprising:
    an annular stator having a stator axis, a first stator side, and a second stator side opposite and spaced apart from the first stator side along the stator axis, wherein the first stator side defines an opening extending to the second stator side, the opening having an inner surface, wherein a first three-phase set of six or more concentrated windings and a second three-phase set of six or more concentrated windings are circumferentially spaced along at least the inner surface of the opening of the stator, wherein the first three-phase set of concentrated windings is circumferentially offset from the second three-phase set of concentrated windings,
    wherein the stator defines twelve or more voids extending from the first stator side to the second stator side, wherein the twelve or more voids are equally circumferentially spaced around the stator, and wherein each of the twelve or more voids is located circumferentially between a concentrated winding of the first three-phase set of six or more concentrated windings and a concentrated winding of the second three-phase set of six or more concentrated windings, wherein the twelve or more voids each have a circular cross-section as viewed in a plane parallel to the first stator side; and
    a rotor comprising four or more soft magnetic core sections and four or more permanent magnets, the rotor having a rotor axis, a first rotor side, and a second rotor side opposite and spaced apart from the first rotor side along the rotor axis
        wherein each of the four or more permanent magnets is circumferentially spaced around the rotor axis between the four or more soft magnetic core sections,
        wherein each of the four or more soft magnetic core sections includes an outer circumferential surface defining a central groove extending axially from the first rotor side to the second rotor side, wherein the central grooves each have a semicircular cross-section as viewed in a plane parallel to the first rotor side,
    wherein the rotor is disposed within the stator opening such that the stator axis and rotor axis are coincident with each other, and wherein flux from the four or more permanent magnets interacts with a stator magnetic field created by a current flowing through the first and second three-phase set of concentrated windings to cause the rotor to turn about the rotor axis.

2. The motor of claim 1, wherein the first three-phase set of six or more concentrated windings includes twelve or more concentrated windings, the second three-phase set of six or more concentrated windings includes twelve or more concentrated windings, and the four or more permanent magnets includes ten or more permanent magnets.

3. The motor of claim 2, wherein the first three-phase set of concentrated windings is circumferentially offset from the second three-phase set of concentrated windings by an offset angle of 75 degrees.

4. The motor of claim 1, wherein the permanent magnets comprise rare earth-free permanent magnets.

5. The motor of claim 4, wherein the rare earth-free permanent magnets comprise ferrite permanent magnets.

6. The motor of claim 5, wherein the ferrite permanent magnets comprise strontium ferrite.

7. The motor of claim 5, wherein the ferrite permanent magnets comprise barium ferrite.

8. The motor of claim 1, wherein the permanent magnets comprise Nd-based rare-earth magnets.

9. The motor of claim 1, wherein each of the twelve or more voids is located radially outwardly from the first three-phase set of concentrated windings and the second three-phase set of concentrated windings.

10. The motor of claim 1, wherein a total number of concentrated windings is greater than a total number of permanent magnets.

11. The motor of claim 1, further comprising a nonmagnetic shaft, and the rotor includes a soft magnetic rotor core, wherein each of the four or more soft magnetic rotor core sections defines a rectangular opening extending from the first rotor side to the second rotor side, and the nonmagnetic shaft includes rectangular protrusions each extending outwardly in a radial direction, wherein each of the rectangular protrusions are disposed within one of the rectangular openings.

12. The motor of claim 11, wherein each of the rectangular protrusions includes one or more cross members extending perpendicular to the radial direction and each of the rectangular openings is configured for receiving one of the cross members.

13. The motor of claim 1, wherein each of the four or more permanent magnets have a magnetic flux, wherein the magnetic flux of each of the four or more permanent magnets is oriented in a radial direction.

14. The motor of claim 1, wherein the four or more permanent magnets are oriented in a spoke-type configuration.

15. The motor of claim 1, wherein the four or more permanent magnets have a rectangular cross-section as viewed in a plane parallel to the first rotor side.

16. The motor of claim 1, wherein the four or more permanent magnets have a trapezoidal cross-section as viewed in a plane parallel to the first rotor side.

17. An electric motor system, the system comprising:
the motor of claim 1;
a power system comprising a direct current battery and an inverter for changing the direct current from the battery into alternating current; and
a computer system for controlling the inverter.

18. The system of claim 17, wherein the inverter is a first inverter, the system further comprising a second inverter, wherein the first three-phase set of six or more concentrated windings is in electrical communication with the first inverter and the second three-phase set of six or more concentrated windings is in electrical communication with the second inverter.

19. The system of claim 17, wherein the inverter is a six-phase inverter, and the first and second three-phase sets of six or more concentrated windings is in electrical communication with the six-phase inverter.

20. The motor of claim 1, wherein the total number of the four or more central grooves is equal to the total number of the four or more permanent magnets.

* * * * *